(12) United States Patent
White

(10) Patent No.: US 6,367,035 B1
(45) Date of Patent: Apr. 2, 2002

(54) METHODS AND APPARATUS FOR DIAGNOSING AND CORRECTING FAULTS IN COMPUTERS BY A SUPPORT AGENT AT A REMOTE LOCATION

(76) Inventor: Adrian Richard White, 2 Wellington Terrace, Dunstable, Bedfordshire LU5 4BJ (GB)

(*) Notice: Subject to any disclaimer, the term of this patent is extended or adjusted under 35 U.S.C. 154(b) by 0 days.

(21) Appl. No.: 09/194,964
(22) PCT Filed: Jun. 3, 1997
(86) PCT No.: PCT/GB97/01498
    § 371 Date: Dec. 7, 1998
    § 102(e) Date: Dec. 7, 1998
(87) PCT Pub. No.: WO97/46940
    PCT Pub. Date: Dec. 11, 1997

(30) Foreign Application Priority Data

Jun. 6, 1996 (GB) .............................................. 9611846

(51) Int. Cl.[7] .......................... G06F 11/00; G06F 11/22
(52) U.S. Cl. ................................ 714/40; 714/31; 379/2
(58) Field of Search ............................. 714/40, 31, 46, 714/47, 25; 379/2; 710/102, 103, 129; 709/223, 224; 717/4; 713/202, 300; 324/522; 307/66; 361/687

(56) References Cited

U.S. PATENT DOCUMENTS 5,274,797 A * 12/1993 Barlow et al.
6,199,180 B1 * 3/2001 Ote et al.

FOREIGN PATENT DOCUMENTS

EP        0247605       12/1987
WO        WO9209954     6/1992

OTHER PUBLICATIONS

"Microprocessor Bus State Monitor System" IBM Technical Disclosure Bulletin., vol. 31, No. 9, Feb. 1989, pp. 399–404.

* cited by examiner

Primary Examiner—Gopal C. Ray
(74) Attorney, Agent, or Firm—Christie, Parker & Hale, LLP

(57) ABSTRACT

Apparatus for diagnosing and correcting faults in a host computer having a central processing unit (CPU) and ancillary units. The apparatus is in two parts; a first part in the form of a service card to be coupled to the host computer and operable to disable the CPU and operate and/or interrogate the ancillary units, and a second part in the form of a remote support station to be coupled to the first part and operable to diagnose faults in the computer through the first part and to effect at least some corrective measures through the first part. The first and second parts are located remote from each other and connected by a telecommunication link such as through modems.

16 Claims, 3 Drawing Sheets

METHODS AND APPARATUS FOR DIAGNOSING AND CORRECTING FAULTS IN COMPUTERS BY A SUPPORT AGENT AT A REMOTE LOCATION

BACKGROUND OF THE INVENTION

The present invention relates to methods and apparatus for diagnosing and correcting faults in computers.

Personal computers (PCs) are now being used more widely than ever before and the applications in which they are used are becoming more diverse including such areas as supermarkets tills.

Computers, however, are not immune from faults and, in order to correct such faults, a trained engineer needs to be called out to the site of the computer where he will need to carry out a number of tests to determine the nature of the fault and to correct the fault.

SUMMARY OF THE INVENTION

It is an object of the invention to provide an improved method and apparatus diagnosing and correcting faults in computers.

According to the present invention there is provided apparatus for diagnosing and correcting faults in a host commuter having a central processing unit (CPU) and ancillary units, the apparatus comprises two parts, a first Dart to be coupled to the host computer and operable to disable the CPU and operate and/or interrogate the ancillary units, and a second part to be coupled to the first part and operable to diagnose faults in the computer through the first part and to effect at least some corrective measures through the first part.

Advantageously, the first and second parts each include a modem, each are located remote from each other and are coupled together through a telecommunication link.

The first part may comprise a service card which can be plugged into the host computer.

The service card may comprise a master controller module for controlling the first part and for issuing commands and transmitting and receiving data through the system bus interface of the host computer.

The service card also includes a voltage measurement module for generating reference voltages and comparison means for comparing them with selected system voltages of the host computer.

The master controller module preferably includes a store for storing a unique serial number identifying the first part or the host computer. The store may also store an access code to enable comparison between the stored access code and one generated by the second part to deny access of the second part to the host computer if equality is not detected.

The first part may also include a system bus sniffer module to store system information from the host computer.

The first part advantageously includes an adaptor module to effect one or more hardware resets of the host computer.

The host computer preferably is a personal computer (PC).

Disabling the CPU may mean physically disabling it, or more generally may mean displacing the CPU so that the first part can access the ancillary units (over the system bus for example).

According to the present invention there is further provided a method for diagnosing and correcting faults in a host computer having a central processing unit (CPU) and ancillary units, the method comprising coupling a first part to the host computer; coupling a second part to the first part; diagnosing faults in the computer at the second part through the first part, and effecting at least some corrective measures through the first part.

BRIEF DESCRIPTION OF THE DRAWINGS

A method and apparatus for diagnosing and correcting faults in computers, will now be described, by way of example, with reference to the accompanying diagrammatic drawings, in which.

DETAILED DESCRIPTION

Figure 1:
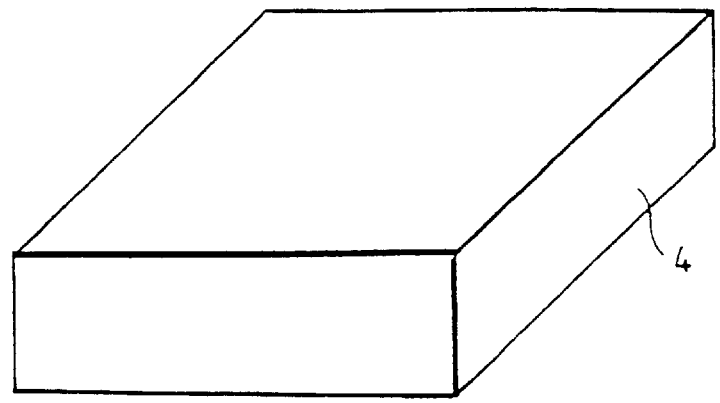
FIG. 1 is a perspective view of a PC cash till (with cover lifted) connected to a remote support station.
Figure 1:
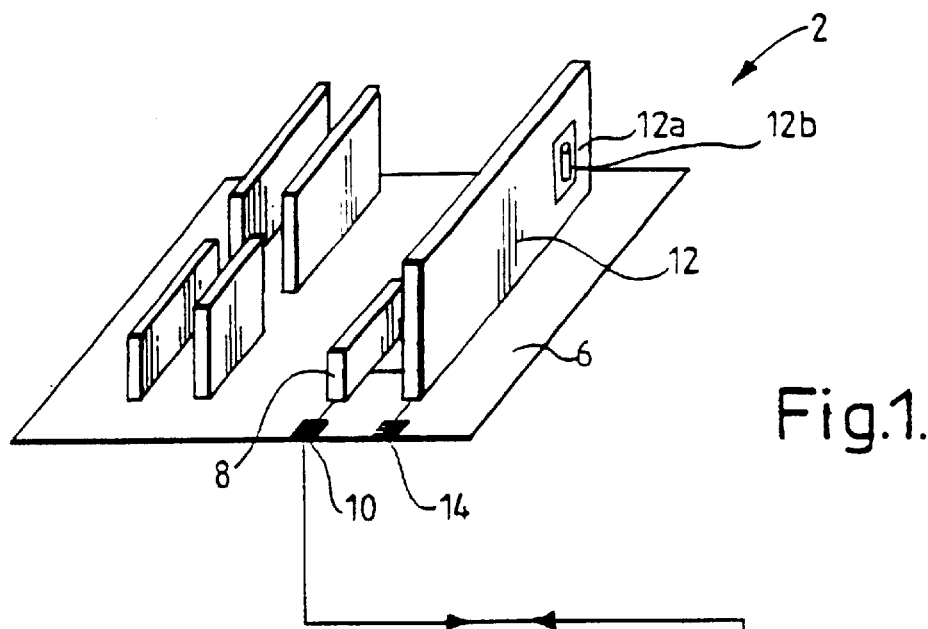
Figure 1:
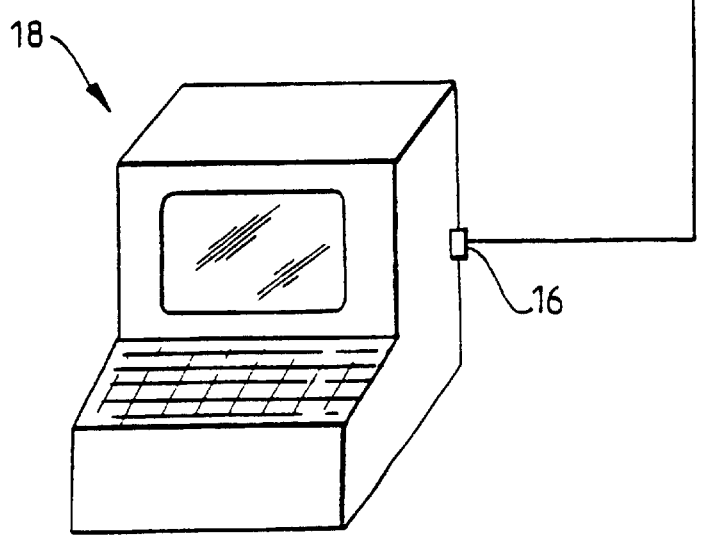

FIG. 1 is a perspective view of a cash till 2 with cover 4 lifted to expose the circuit board 6 carrying the different components of the PC providing the basic tasks of the cash till. To this board 6 are added a modem 8 connected to a telephone port 10 and a service card 12 connected to the modem 8 and also a port 14.

The service card 12 includes at least one central processing unit (CPU) which can temporarily displace the central processing unit (CPU) of the PC to allow faults to be diagnosed and corrected in the parts of the PC which are normally connected to and controlled by the CPU of the PC.

The service card may be provided with a battery carrier 12a for carrying one or more batteries 12b.

The port 10 is connected by a telephone line 2Q to the port 16 of a modem in a remote support station 18.

A service engineer located at the remote support station 18 can now interrogate the cash till 2 from a remote location to diagnose any faults. If faults are software faults, these can usually be corrected there and then. If the faults are hardware faults, the necessary parts can be ordered and installed at a later date. Instead, if the service engineer is available locally, he may plug his service station into the port 14 by-passing the modem 8.

The battery 12b (typically an alkaline battery having at least 10 years life under normal conditions). serves to power the serve card 12 when the PC is not powered, or when the power supply in the PCT is faulty. Thus, the service board may be used to diagnose power supply problems. Also, a service provider at station 18 can be made aware if a user has not switched on the PC. The service card 12 may also be used to remotely reset the PC without user intervention.

When the service board is plugged into a PC or telephone line, the battery may be switched off automatically to preserve battery life.

Figure 2:
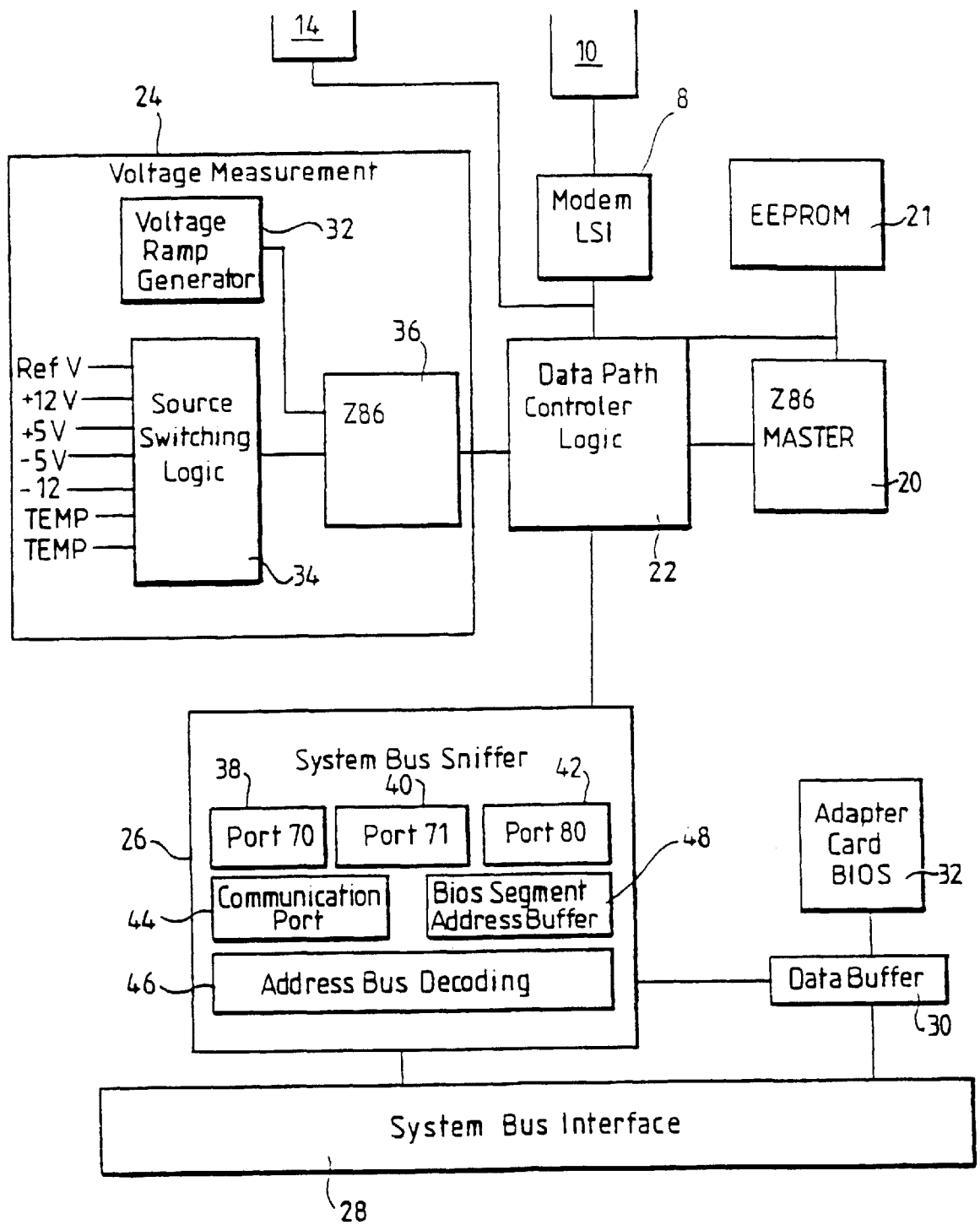
FIG. 2 is a block diagram of the apparatus connected to the system bus of the host computer.

FIG. 2 is a block diagram of the service card 12. The service card consists of a number of modules operating under the control of a master controller module 20. The master controller module 20 is in the form of a dedicated Z86 chip. A data path control module 22 operates under the control of the master to control module 20 selectively to connect the master control module 20 to the modem, to a voltage measurement module 24, and to a system bus sniffer 26. The system bus sniffer 26 is in turn connected to the system bus interface 28 both directly and also through a data buffer 30. An adaptor card BIOS is connected to the data buffer.

The Z86 of the master controller module includes a read only memory (ROM) containing code for execution by the master controller module itself. In addition, there are several discrete items of embedded information. These items include a unique serial number, an access code and a back door code.

The unique serial number identifies the service card 12 and therefore by implication identifies the host PC. The service station can thus obtain the identity of the host PC and use it to check against a data base (not shown) at the service station 18 containing service contracts and/or special requirements or for billing purposes.

The master controller module 20 includes a first comparator (not shown) to compare the stored access code with an authorisation code stored and sent by the service station 18, to the master controller module 22 to inhibit access to the host PC by the service station if equality is not detected. The master controller module 20 includes a second comparator (not shown) to compare the back door code with a secret override code fed into the service station 18 and sent to the master controller module 20. When equality is detected any access inhibition by master controller module 20 is lifted.

The data path controller module 22 includes an array of logic gates, however it will be appreciated the function of the gates could be performed by a dedicated Z86 chip.

This module has five separate latches namely:

1) An output destination latch
   This will be written to by the master controller module 20 and will identify which subsystem the master controller is intending to send data to;
2) An output data latch
   This holds data written to by the master controller module 20 and will, in due course, be passed on the appropriate subsystem by the data path controller module 22;
3) An input data latch
   This holds data sent from a separate subsystem on the board destined for the master controller module 20;
4) An input source latch
   This holds data that identifies which subsystem the input data originates from; and
5) A data path status
   This is a bit wise register that shots the status of the data path. It will be readable by any subsystem on the board and will be used to control the transfer of data to and from the master controller.

The protocol for data transfer from the master controller is as follows:

1) The master controller recursively reads the data path status register until the "output data clear" is active.
2) The master controller sends a byte out to the output data latch.
3) The master controller sends a destination identification code ID to the output destination latch.
4) The data path controller sends the "output data clear" bit into the inactive state.
5) The data path controller sends a signal to the appropriate subsystem.
6) The subsystem reads the output data latch.
7) The output data clear bit is sent back to the active state.

The voltage measurement module 24 is arranged to create reference voltages against which various system voltages of the host PC can be compared by way of detecting possible causes of system faults. The module includes a voltage ramp generator 32, a source switching logic circuit 34 and Z86 chip which functions as an analogue to digital converter and a comparator. Thus, the reference voltages and sensed voltages are converted from analogue to digital form before being digitally compared.

As a means of calibration, the voltage ramp produced by the voltage ramp generator 32 will be timed against the onboard voltage reference approximately once every thirty seconds. This will allow the chip 36 to compensate for operating condition variations (such as temperature).

In operation, all analog signals to be sampled in the host PC are read in a polled manner (i.e., each analog input is sampled approximately once every five seconds).

For each analogue voltage measured the following process will be carried out:

1) The voltage ramp generator circuit is reset.
2) The analog voltage being evaluated is fed into one of the comparator circuits of the chip 36. The complimentary input to this comparator is the output from the voltage ramp generation circuit 32.
3) The time taken for the voltage ramp to reach the level of the analog voltage is used to calculate the actual voltage.
4) The calculated analog voltage is stored internally. In the event of a voltage measurement request being received, this internal copy is returned.

In the event that any analog voltage is required by the master controller module 20, the following process will occur:

The chip 36 will receive an external interrupt following which it will read in a byte of data that will identify the analog measurement being requested upon receipt of which it will issue the last known value of the requested analog value.

To reduce the byte size needed to transmit an absolute voltage value to at least one place of decimal, the value returned by any measurement request is that of the deviation from ideal, and centred on a value of 128 tenths (12.3 volts). For example; If the voltage of the +12 volt line is actually 12.7 volts the value returned would be 135 (123 being ideal—7 tenths). Using this form of notation we could return a value of deviation in the range of −12.6 to +12.6 volts.

The system bus sniffer module 26 includes three latches 38, 40, 42 and 44 respectively for ports 70, 71, 80 and the main communication port of the host PC. The module also includes an address bus decoding logic circuit 46 and a BIOS segment address buffer 48.

The primary function of this module is to glean information about the system of the host PC without directly manipulating it. This is achieved by taking copies of any system information being accessed by the motherboard BIOS routines. Using this technique features such as CMOS set-up and POST codes can be obtained.

Since this feature will require decoding of the system address bus, this subsystem also incorporates control of the adapter card BIOS chip module 32. The BIOS segment address buffer 30 is included for this purpose.

The BIOS segment address buffer 30 is a latch that is written to by the master controller before entering "mastering mode". This may be updated on subsequent reboots to allow flexibility of the board.

The system address bus decoding logic circuit 46 will take account of the value stored in the buffer 48 to control the adaptor card module 32 when the adaptor card module 32 presents itself to the system data bus interface 28.

The adaptor card BIOS module 32 includes a read only memory chip.

This adaptor module 32 is screened from the host PC system data bus by the data buffer 30. Under normal running conditions this data buffer 30 will have its output disabled and will therefore play no part. The adaptor module 32 will only be apparent under "mastering mode" conditions.

When the service card goes into "mastering model" the segment address for the adaptor card BIOS module 32 will be loaded into the BIOS segment address buffer (see system bus sniffer section). The master controller module 20 will then assert a hardware reset.

Once the reset is released the host PC system motherboard BIOS chip module 32 will go through its POST sequence. One part of this sequence is the detection, and running of adaptor card BIOS module 32.

In the meantime, the system bus sniffer module 26 monitors the address bus for any memory access in the range of the adapter card BIOS. When such as address is detected it will place the offset onto the pins of the adapter card BIOS chip and send an output enable signal to the data buffer. Under these conditions the motherboard BIOS will detect adaptor card BIOS module 32 and start running it.

The code that is included in the adaptor module 32 is kept to the absolute minimum i.e., within a limit of 2 kilobytes. Furthermore, the routines on the adaptor card module 32 are very conservative on system resources (RAM usage is kept within 16 kilobytes).

There is one vital routine that is included in the adaptor module 32. This is a routine that will download other routines from a remote service station 18 and run them. The "communication port" 44 included in the system bus sniffer module 26 provides this function. The mechanism that is used for this transfer is as follows.

After initialisation the adapter module 32 is send a "ready" byte to the "communication port" 44 and start polling the communication port for input. Meanwhile, the master controller module 20 will be polling the communication port 44 and upon finding the "ready" byte will pass this on to the remote service station 18 via the modem 8. The remote service station 18 will send the code of the new routine (proceeded by a header) over the modem 8 and the master controller module 20 will read the code from the modem and pass it on to the communication port 44. The routine in the adaptor card module will read the header (which includes length information) and the following code. The routine will then pass control to the received code in memory.

Any output from the new routine will be built into the routine itself and will be sent out through the communication port 46.

The EEPROM module 21 is used to store critical information including the segment address of the adapter card module 32. This saves recursively rebooting to find vacant addresses. Also stored is a backup of a "default" CMOS set up for making the machine bootable, a backup copy of the host PC system hard disk information (such as size, partition table, etc), and users account number to automate billing of service work.

All system type information can be stored on this EEPROM the very first time the service card 12 is "booted". Any subsequent system boots could be compared to this copy and changes noted. This could also be used as a kind of hardware anti-virus protection.

The service station 18 includes an external control interface. The features addressed by the external control software controlling the interface may be divided into three categories. These are:

Catagory 1 Requests for Basic Information

Basic information includes any item that may be read from the host PC system without any direct manipulation. This would include voltage measurements, post 80 codes and possibly CMOS set-up.

Catagory 2 Requests for Complex Information

Complex information includes any item that would require running of software on the host PC system. These items would include Track 0 data, possibly CMOS set-up. Boot sector information and operating system dependant items.

Catagory 3 Repair of Soft Errors

Repair of soft errors involves correcting errors found on the host PC system. Examples of items, that could be addressed in this manner include, CMOS set-up, Track 0, boot sector and system files.

All features that fall into category 1 could be carried out automatically on receipt of a signal from the service card 12. These items could therefore be built into the interface programme.

Features that fall into the second or third category will require the running of software on the host PC system being interrogated. Each of these features will require code to be downloaded. Obviously, different host PC systems may require different diagnosis/repair routines.

The software is designed in a manner that will allow for easy updating of these code modules. It is proposed that the interface to the user does not implicitly have any of these types of modules buit in, but rather, auto detects any modules available. One method of achieving this aim would be to have a separate file for each module, with a standardized extension e.g., XXX and possibly another associated file giving details e.g., YYY.

The XXX file could contain the raw code for a routine to be downloaded, while the associated YYY file would contain items such as:

module description;

data items that need to be written in to the code;

data items that may be returned by the code; and dependency on other modules.

The interface program would then only need to do a "Findfirst" and "Findnext" to detect which modules are available and create its menu listings accordingly.

For the sake of integrity, a method is devised so that items extracted by one module can be used as parameters for another. An example of this type could be say one module that auto detects the hard disc type of the machine and then a subsequent module uses the head sector and track count to carry out a surface analysis.

Batch files are used to cause various commands to be carried out sequentially.

Software that is destined to run on the service station is supplied in a complete form but without an access code. Since this access code is required before the software will operate the user must register the software. This is done in the following manner:

1) The service agent will install the remote diagnosis software into the service station.

2) The service agent runs the "register software" option and follows the menu instructions to set parameters such as modem set-up, etc.

3) The software investigates the host PC system and appends details about the system to the end of the .EXE file.

4) The software dials out to the "registration line".

5) Diagwares registration line is answered by a modem.

6) The modem requests the serial number of the software.

7) The software serial number is validated against a database.

8) If all is well an access code and validity date is sent back to the service station.

9) The remote diagnosis software appends this access code to the end of the .EXE file.

When the remote diagnosis software is run it will wait for a "hello" signal to be sent from the malfunctioning machine. Upon receipt of this signal the service agent software will:

Read the access code and validity date information from the end of the .EXE file.

Create a code made up of the above two items and the current date.

Send the code in its entirety to the malfunctioning machine.

The master controller on the remote machine will decrypt this code and check for validity.

If the service agent software is past its validity date or the agent code is incorrect then the master controller will send a signal back to indicate the failure and break communications.

Dedicated firmware may be provided to control who has permission to talk to the service board.

Some service cards can be produced to accept ANY valid service agent access code. To allow this work we would have to ensure that the service agent access codes all follow a set format. One such format could be:

12 Hex digits followed by a checksum followed by an ASCII code.

Figure 3:
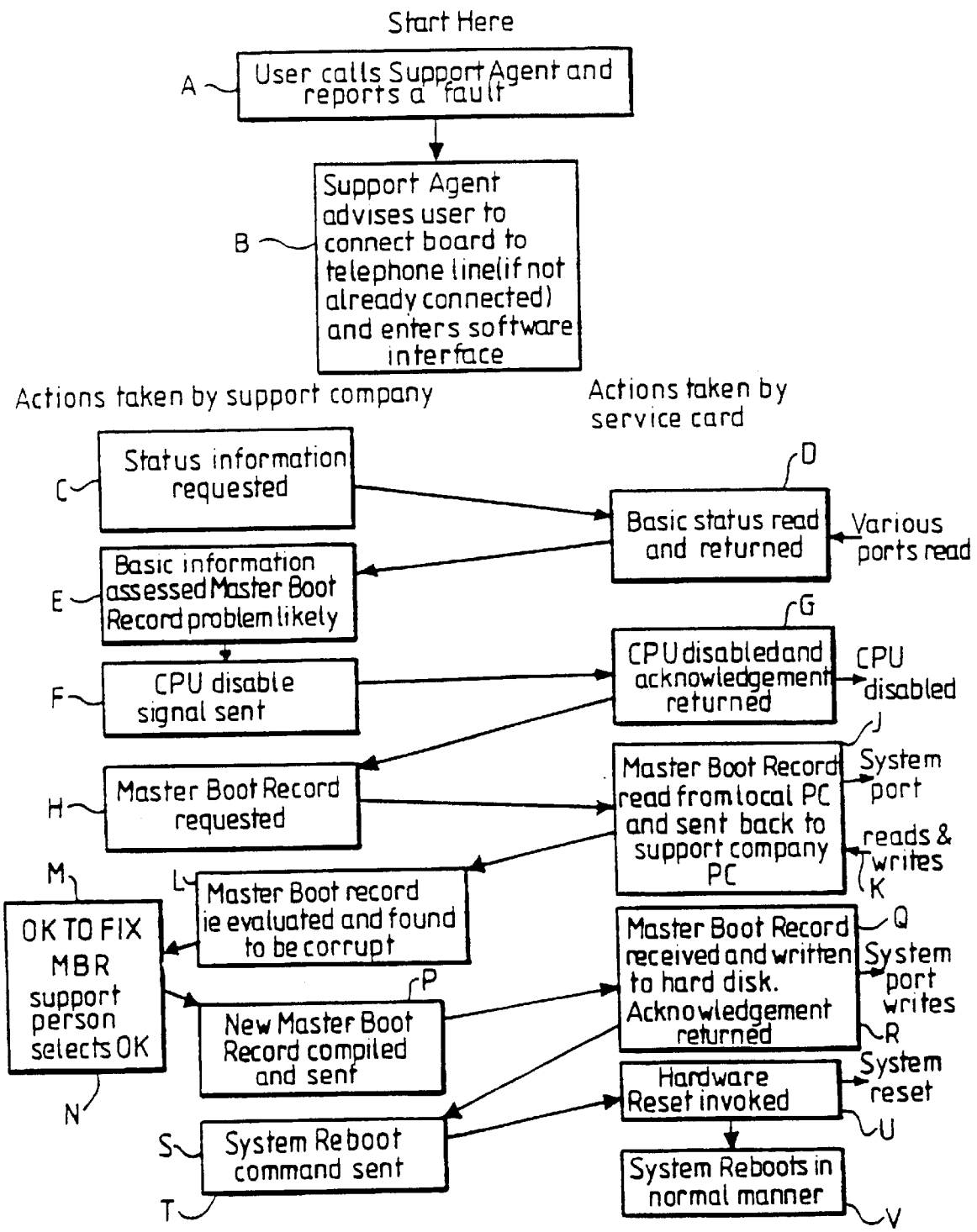
FIG. 3 is flow diagram illustrating the detection of the correction of a fault.

An example of a fault detection and repair will now be described with reference to FIG. 3 in the case where the master boot record of the host PC has been corrupted. The corruption may have occurred as a result of a virus infection or a system crash.

The user of the host machine thus finds that he is unable to boot up his machine. Assuming the users machine has a service board fitted, the following-sequence of events will put the problem right.

A. The user telephones his support agent to report that his machine has gone wrong.

B. The support agent advises the user to plug the telephone line into the port 10.

The agent runs his copy of the engineering interface on his local support station 18. At this point the agents computer enters into direct communication with the user's machine.

C. The agents software issues commands over the modem link to the service card 12 to request basic system status information.

D. The service card 12 sends data, concerning the status of the host PC, to the agents service station 18.

E. The agents software evaluates this initial data, and ascertains where the boot process is falling. (This will throw suspicion on the master boot record.)

F. The agents software then sends a command to disable the CPU of the host PC and waits for a ready signal (G) to be returned.

H. Once the ready signal has been received, the agents software sends a command to read the master boot record of the hard disk of the host PC.

J. The service card 12 locally manipulates the PC bus to cause the hard disk adapter to read the appropriate sector from the hard disk.

K. The service card 12 sends the data from the master boot record to the agents service station 18.

L. The agents software evaluates the master boot record and establishes that it is corrupt.

M. The error is indicated to the engineer and prompts for "OK to fix MBR?."

N. The engineer accepts this prompt.

P. The agents software compiles a suitable master boot record to replace the corrupt copy.

Q. The agents software sends the new master boot record to the service card 12 and waits for a signal that it has been written.

R. The service card 12 receives the new master boot record and writes this to the hard disk by direct manipulation of the PC bus. It then sends a signal to the agents service station 18 to indicate that it has been successfully written to the hard disk.

S. The engineer is informed by his software that the new master boot record has been written to the hard disk.

T. The agents software sends a "reboot" command to the service card 12.

U. The service card 12 causes a hardware reset on the host PC. It now reboots successfully (V).

In some embodiments of the invention a temperature sensor may be fitted or connected to the service card. Measurement of air temperature may help in diagnosing some faults.

The power-up 'POST CODES' of the PC may be recorded and sent to the support company, giving indication of any power-up failure. This can identify at which stage the power-up sequence fails, and therefore can indicate the area of a fault within a users PC.

What is claimed is:

1. An apparatus for diagnosing and correcting faults in a host computer having a host central processing unit and ancillary units, the apparatus comprising:

a first part coupled to the host computer; and a second part coupled to the first part through a telecommunication link that links a user of the host computer and a support agent for the second part;

the first part having:

a first part central processing unit operable to disable and displace the host central processing unit and operate and interrogate the ancillary units in place of the host central processing unit, and a store for storing a unique serial number identifying the first part and host computer and an identifying access code to enable comparison between a stored identifying access code and a comparison access code generated by the second part, wherein access of the second part to the host computer is denied if equality between the stored identifying access code and the comparison access code is not detected;

the second part, upon obtaining second part access to the host computer, being operable to diagnose faults in the host computer through the first part and to effect at least some corrective measures through the first part.

2. The apparatus as claimed in claim 1, wherein the first part and the second part are each associated with a modem.

3. The apparatus as claimed in claim 1, wherein the first part includes a service card pluggable into the host computer.

4. The apparatus as claimed in claim 3, wherein the service card includes a master controller module for controlling the first part and for issuing commands and transmitting and receiving data through a system bus interface of the host computer.

5. The apparatus as claimed in claim 4, wherein the service card includes a voltage measurement module for generating reference voltages and comparison means for comparing them with selected system voltages of the host computer.

6. The apparatus as claimed in claim 5, wherein the voltage measurement module further provides temperature compensation.

7. The apparatus as claimed in claim 4, wherein the first part includes a system bus sniffer means to store system information from the host computer.

8. The apparatus as claimed in claim 1, wherein the first part includes means to effect one or more hardware resets of the host computer.

9. The apparatus as claimed in claim 1, wherein the host computer is a personal computer.

10. The apparatus as claimed in claim 1, wherein the first part includes a battery.

11. A method of diagnosing and correcting faults in a host computer having a host central processing unit and ancillary units, the method comprising:

coupling a first part to the host computer, the first part having a first part central processing unit operable to disable and displace the host central processing unit and operate and interrogate the ancillary units in place of the host central processing unit;

coupling a second part to the first part through a telecommunication link that links a user of the host computer and a support agent for the second part;

storing in the first part:

a unique serial number identifying the first part and host computer, and an identifying access code to enable comparison between a stored identifying access code and a comparison access code generated by the second part;

comparing the stored identifying access code and the comparison access code and denying access of the second part to the host computer if equality between the stored identifying access code and the comparison access code is not detected; and upon obtaining second part access to the host computer, diagnosing faults in the host computer at the second part through the first part, and effecting at least some corrective measures through the first part.

12. The method as claimed in claim 11, wherein the first part is controlled to transmit and receive data through a system bus interface of the host computer.

13. The method as claimed in claim 11, wherein reference voltages are generated and compared with selected system voltages of the host computer.

14. The method as claimed in claim 11, wherein system information from the host computer is stored.

15. The method as claimed in claim 11, wherein the first part is operable to disable the host computer processor and to operate and interrogate the ancillary units.

16. The method as claimed in claim 11, wherein the first part is arranged to effect one or more hardware resets of the host computer is necessary.

* * * * *

UNITED STATES PATENT AND TRADEMARK OFFICE
CERTIFICATE OF CORRECTION

| | | |
|---|---|---|
| PATENT NO. | : 6,367,035 B1 | Page 1 of 1 |
| APPLICATION NO. | : 09/194964 | |
| DATED | : April 2, 2002 | |
| INVENTOR(S) | : Adrian Richard White | |

It is certified that error appears in the above-identified patent and that said Letters Patent is hereby corrected as shown below:

Column 1, line 26, "commuter" should read --computer--.

Column 1, line 26, "Dart" should read --part--.

Column 7, line 46, "agents" should read --agent's--.

Column 7, line 48, "agents" should read --agent's--.

Column 7, line 52, "agents" should read --agent's--.

Column 7, line 53, "agents" should read --agent's--.

Column 7, line 54, "falling" should read --failing--.

Column 7, line 56, "agents" should read --agent's--.

Column 7, line 59, "agents" should read --agent's--.

Column 7, line 67, "agents" should read --agent's--.

Column 8, line 1, "agents" should read --agent's--.

Column 8, line 6, "agents" should read --agent's--.

Column 8, line 8, "agents" should read --agent's--.

Column 8, line 14, "agents" should read --agent's--.

Column 8, line 19, "agents" should read --agent's--.

Signed and Sealed this
Fourteenth Day of February, 2012

David J. Kappos
*Director of the United States Patent and Trademark Office*